US008791211B2

(12) United States Patent
Chang et al.

(10) Patent No.: US 8,791,211 B2
(45) Date of Patent: Jul. 29, 2014

(54) HIGH REFRACTIVE POLYMERS, OPTICAL ELEMENTS, AND PHOTOELECTRIC DEVICE EMPLOYING THE SAME

(75) Inventors: Ming-Jyh Chang, Hsinchu (TW); Zhi-Long Chen, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 331 days.

(21) Appl. No.: 13/160,119

(22) Filed: Jun. 14, 2011

(65) Prior Publication Data
US 2012/0197000 A1     Aug. 2, 2012

(30) Foreign Application Priority Data
Feb. 1, 2011 (CN) .......................... 2011 1 0034374

(51) Int. Cl.
    C08G 59/00    (2006.01)
    C08G 63/08    (2006.01)
    C08G 65/26    (2006.01)
    C08G 65/32    (2006.01)
    G02B 1/04     (2006.01)

(52) U.S. Cl.
    CPC ....................................... G02B 1/04 (2013.01)
    USPC .............. 525/438; 525/407; 528/97; 528/110

(58) Field of Classification Search
    CPC ........ C08G 59/00; C08G 63/08; C08G 65/26; C08G 65/32
    USPC .............................. 525/438, 407; 528/97, 110
    See application file for complete search history.

(56) References Cited

U.S. PATENT DOCUMENTS

| | | | |
|---|---|---|---|
| 5,132,374 A * | 7/1992 | Reischmann et al. ........ | 525/415 |
| 5,633,331 A | 5/1997 | Nichols et al. | |
| 6,800,381 B2 | 10/2004 | Cho et al. | |
| 6,835,468 B2 | 12/2004 | Cho et al. | |
| 7,446,159 B1 | 11/2008 | Samukawa et al. | |
| 2006/0157717 A1* | 7/2006 | Nagai et al. ..................... | 257/81 |
| 2008/0114100 A1 | 5/2008 | Hatsuda et al. | |
| 2010/0184923 A1* | 7/2010 | Yoshida et al. ............... | 525/418 |

FOREIGN PATENT DOCUMENTS

| | | | |
|---|---|---|---|
| TW | 201026735 A1 | 7/2010 | |
| WO | WO 2009/013955 A1 | 1/2009 | |
| WO | WO 2009013955 A1 * | 1/2009 | |

OTHER PUBLICATIONS

Claudio A. Terraza et al., "Synthesis and Properties of Highly Refractice Polyimides Derived from Fluorene-Bridged Sulfur-Containing Dianhydrides and Diamines" *J. Polymer Science: Part A: Polymer Chemistry*, vol. 46, pp. 1510-1520 (2008).

Shinichi Kawasaki et al., "Synthesis and Chemical, Physical, and Optical Properties of 9,9-Diarylfluorene-Based Poly(ether-ether-ketone)" *Macromolecules* 2007, vol. 40, pp. 5284-5289.

Hideki Hayashi et al., "Synthesis and Properties of Polysiloxanes Possessing 9,9-Diarylfluorene Structure in the Main Chain" *Polymer Journal*, vol. 41, No. 4, pp. 272-278, 2009.

* cited by examiner

*Primary Examiner* — Randy Gulakowski
*Assistant Examiner* — Ha Nguyen
(74) *Attorney, Agent, or Firm* — Muncy, Geissler, Olds & Lowe, P.C.

(57) ABSTRACT

High refractive polymers, optical elements, and optical elements employing the same are provided. The polymer includes a repeat unit represented by Formula (I):

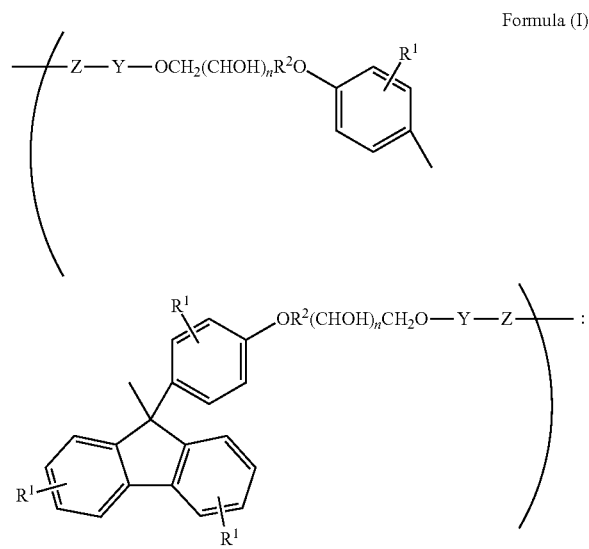

Formula (I)

wherein: $R_1$ is independently an H, $C_{1-8}$ alkyl group, $C_{1-8}$ alkoxy group, or halides; $R_2$ is independently an $C_{1-8}$ alkyl group, $C_{1-8}$ alkoxy group, or $C_{1-8}$ alkanol group; n is 0, or 1; Y is

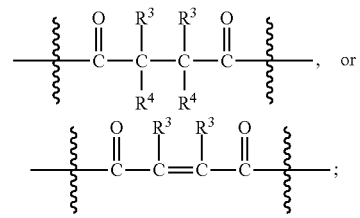

$R_3$ and $R_4$ are each independently an H, $C_{1-8}$ alkyl group, $C_{1-8}$ alkoxy group, cycloalkyl group, aryl group, heteroaryl group, or heterocycloalkyl group, and two adjacent $R_3$ groups are optionally combined with the carbon atoms which they are attached thereto, to form a cycloalkyl group, aryl group, heteroaryl group, or heterocycloalkyl group; and Z is independently a residual group of polycaprolactone diol, or a residual group of polyethylene glycol.

13 Claims, No Drawings

HIGH REFRACTIVE POLYMERS, OPTICAL ELEMENTS, AND PHOTOELECTRIC DEVICE EMPLOYING THE SAME

CROSS REFERENCE TO RELATED APPLICATIONS

This application is based upon and claims the benefit of priority from the prior China Patent Application No. 201110034374.1, filed on Feb. 1, 2011, the entire contents of which are incorporated herein by reference.

BACKGROUND

1. Technical Field

The present invention relates to a polymer, optical elements, and photoelectric device employing the same, and in particular relates to a high refractive polymers, optical elements, and optical elements employing the same.

2. Description of the Related Art

Light emitting diodes (LEDs) have high brightness, low volume, low power consumption and long life and such as, are used in a variety of display products. Recently, light emitting diodes (LEDs) have been applied widely, with high brightness LEDs heavily demanded. A total light extraction efficiency of an LED is determined by a diode chip, packaging style and encapsulation material. Currently, internal light extraction efficiency of an LED chip has reached more than 90%, but the total light extraction efficiency of an LED is only 30%. The low total light extraction efficiency of an LED is due to large refractive index differences between LED chips and conventional transparent encapsulations. Light emittance of an LED chip will pass through the conventional encapsulation and produce a total reflection. Light emitting from the LED chip is limited by the interior of LED package such that the total light extraction efficiency of the LED is reduced. Therefore, an LED encapsulation material with high refractive index is desired.

According to Snell's law, light traveling from a region having a high index of refraction to a region with a low index of refraction that is within a certain critical angle (relative to the surface normal direction) will cross to the lower index region. Light that reaches the surface beyond the critical angle will not cross but will experience total internal reflection (TIR). In the case of an LED, the IR light can continue to be reflected within the LED until it is absorbed. Because of this phenomenon, much of the light generated by conventional LEDs is not emitted, degrading its efficiency.

For example, a white light emitting diode (LED) chip has a refractivity of about 2-4, such as GaN film with a refractivity of 2.5, and GaP film with a refractivity of 3.45. Since the refractivity of a light emitting diode chip is much higher than that of conventional encapsulation material (such as epoxy resin or silicone resin with a refractivity of 1.40-1.53), the great refractivity difference between the light emitting diode chip and the encapsulation material causes a total internal reflection at an interface therebetween, resulting in a part of the emitted light being trapped within the light emitting diode chip until it is absorbed. In the white light emitting diode chip employing a blue light emitting diode (with a refractivity of 2.5) and a yellow phosphor (YAG), the white light emitting diode chip has a 30% increase in light extraction efficiency, when the refractivity of the encapsulation material is increased from 1.5 to 1.7. Therefore, the total internal reflection can be reduced by increasing the refractivity of the encapsulation material for reducing the refractivity difference between the light emitting diode chip and the encapsulation material.

In order to solve the aforementioned problems, U.S. Pat. No. 5,633,331 discloses an encapsulation material with high refractivity. The encapsulation material is prepared by blending a fluorene carbonate polymer and polysulfone.

U.S. Pat. No. 7,446,159 also discloses an encapsulation material with high refractivity. The encapsulation material is prepared from a fluorene monomer with acrylic functional groups (having a structure represented by

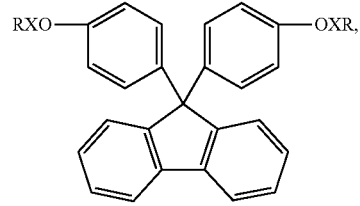

wherein X is —(CH$_2$CH$_2$O)$_n$—, —(CH$_2$CH$_2$O)—CH$_2$CH(OH)CH$_2$O—, n is 1-5, and R is an acrylic group or methacrylic group). Since the above monomer has high viscosity, the encapsulation material exhibits poor film forming properties. Thus, it is difficult to form a film of the encapsulation material via spin coating, screen printing, or mold injection processes.

U.S. Pub. 2008/0114100A1 discloses an encapsulation material with high refractivity. The encapsulation material is prepared by blending a fluorene having acrylic functional groups with a compound having a structure represented by

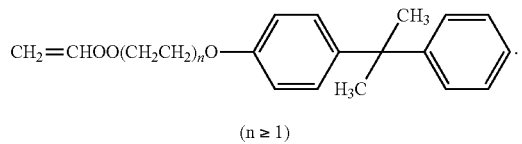

(n ≥ 1)

However, the encapsulation material has hardness of about Shore A 90, and exhibits poor flexibility and thermal stress relaxation.

SUMMARY

An exemplary embodiment of a high refractive polymer includes a repeat unit represented by Formula (I)

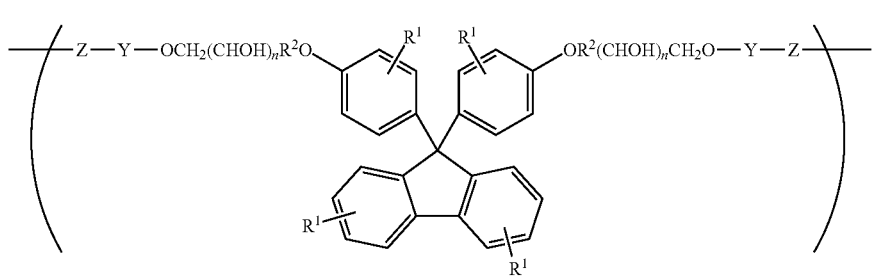

Formula (I)

wherein: $R_1$ is independently an H, $C_{1-8}$ alkyl group, $C_{1-8}$ alkoxy group, or halides; $R_2$ is independently an $C_{1-8}$ alkyl group, $C_{1-8}$ alkoxy group, or $C_{1-8}$ alkanol group; n is 0, or 1; Y is

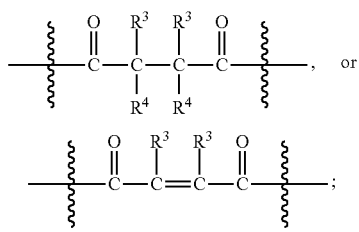

$R_3$ and $R_4$ are each independently an H, $C_{1-8}$ alkyl group, $C_{1-8}$ alkoxy group, cycloalkyl group, aryl group, heteroaryl group, or heterocycloalkyl group, and two adjacent $R_3$ groups are optionally combined with the carbon atoms which they are attached thereto, to form a cycloalkyl group, aryl group, heteroaryl group, or heterocycloalkyl group; and Z is independently a residual group eliminating hydrogen atoms from terminal hydroxyl groups of a polyester diol, or a residual group eliminating hydrogen atoms from terminal hydroxyl groups of a polyether diol.

According another exemplary embodiment, the high refractive polymer includes a product produced by the following steps: reacting an (a) anhydride with a (b) polydiol to prepare a compound, wherein the (b) polydiol comprises a polyester diol or polyether diol; and reacting the compound with a (c) bisphenol fluorene derivative, wherein the (c) bisphenol fluorene derivative has a structure represented by Formula (II):

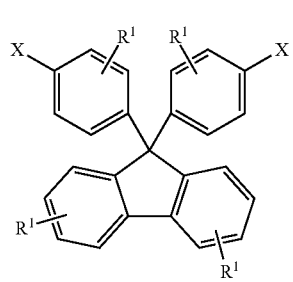

Formula (II)

wherein: $R_1$ is independently a hydrogen, $C_{1-8}$ alkyl group, $C_{1-8}$ alkoxy group, or halogen; X is

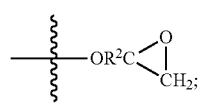

and $R_2$ is independently a hydrogen, $C_{1-8}$ alkyl group, $C_{1-8}$ alkoxy group, or $C_{1-8}$ alkanol group.

Further, the disclosure provides an optical element, wherein the optical element includes the aforementioned high refractive polymer. The optical element can serve as an encapsulation material, a transparent substrate, a lens, or a functional film. Moreover, the disclosure also provides a photoelectric device including the aforementioned optical element. The photoelectric device can include a light emitting diode, solar cell, semiconductor device, or display device.

The disclosure provides a method for preparing a high refractive polymer, including: reacting an (a) anhydride with a (b) polydiol to prepare a compound, wherein the (b) polydiol comprises a polyester diol or polyether diol; and reacting the compound with a (c) bisphenol fluorene derivative, wherein the (c) bisphenol fluorene derivative has a structure represented by Formula (II):

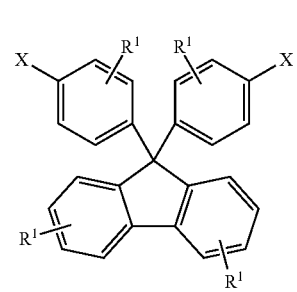

Formula (II)

Wherein: $R_1$ is independently a hydrogen, $C_{1-8}$ alkyl group, $C_{1-8}$ alkoxy group, or halogen; X is

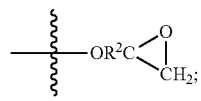

and $R_2$ is independently a hydrogen, $C_{1-8}$ alkyl group, $C_{1-8}$ alkoxy group, or $C_{1-8}$ alkanol group.

A detailed description is given in the following embodiments with reference to the accompanying drawings.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

The high refractive polymer of the disclosure has a repeat unit represented by Formula (I)

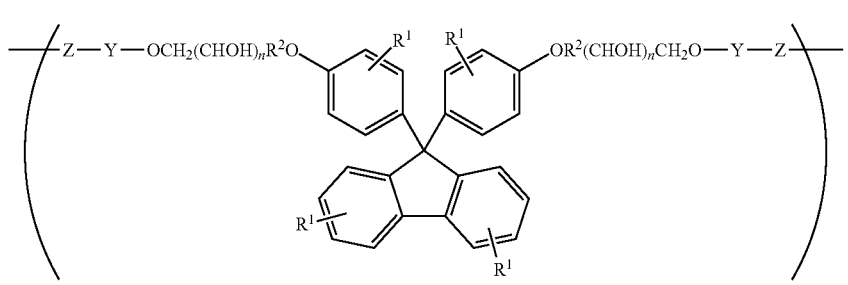

Formula (I)

wherein: $R_1$ is independently an H, $C_{1-8}$ alkyl group, $C_{1-8}$ alkoxy group, or halides; $R_2$ is independently an $C_{1-8}$ alkyl group, $C_{1-8}$ alkoxy group, or $C_{1-8}$ alkanol group; n is 0, or 1; Y is

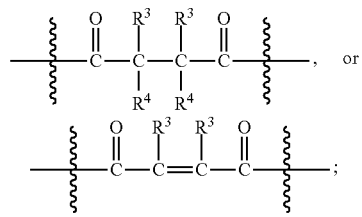

$R_3$ and $R_4$ are each independently an H, $C_{1-8}$ alkyl group, $C_{1-8}$ alkoxy group, cycloalkyl group, aryl group, heteroaryl group, or heterocycloalkyl group, and two adjacent $R_3$ groups are optionally combined with the carbon atoms which they are attached thereto, to form a cycloalkyl group, aryl group, heteroaryl group, or heterocycloalkyl group; and Z is independently a residual group eliminating hydrogen atoms from terminal hydroxyl groups of a polyester diol, or a residual group eliminating hydrogen atoms from terminal hydroxyl groups of a polyether diol.

According to an embodiment of the disclosure, the polyester diol can include a poly(caprolactone)diol, and Z can be,

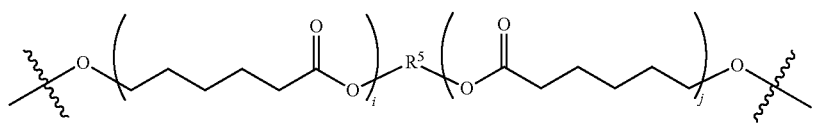

wherein: $R_5$ is an alkyl group or alkoxy group, and i and j are independently an integer equal to or greater than 1. Further, the polyether diol can include a polyethylene glycol, and z is

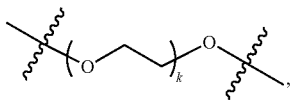

wherein k is an integer equal to or greater than 1.

According to some embodiments of the disclosure, the high refractive polymer of the disclosure can include the product produced by the following steps: reacting an (a) anhydride with a (b) polydiol to prepare a compound, and reacting the compound with a (c) bisphenol fluorene derivative.

According to an embodiment of the disclosure, the molar ratio between the (a) anhydride and the (b) polydiol is equal to or more than 2.

According to an embodiment of the disclosure, the (a) anhydride can be

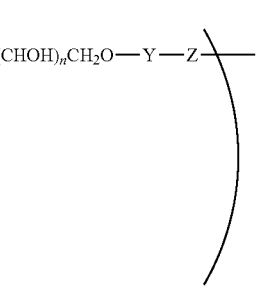

wherein $R_3$ and $R_4$ are each independently an H, $C_{1-8}$ alkyl group, $C_{1-8}$ alkoxy group, cycloalkyl group, aryl group, heteroaryl group, or heterocycloalkyl group, and two adjacent $R_3$ groups are optionally combined with the carbon atoms which they are attached thereto, to form a cycloalkyl group, aryl group, heteroaryl group, or heterocycloalkyl group. Further, the (a) anhydride can include succinic anhydride, 2,3-dimethylsuccinic anhydride, 2,3-diethylsuccinic anhydride, maleic anhydride, 2,3-dimethylmaleic anhydride, 2,3-diethylmaleic anhydride, phthalic anhydride, methylphthalic anhydride, tetrahydromethylphthalic anhydride, hexahydrophthalic anhydride, methylhexahydrophthalic anhydride,- methyl-5-norbornene-2,3-dicarboxylic anhydride, or combinations thereof. According to an embodiment of the disclosure, the (b) polydiol includes a polyester diol (such as poly(caprolactone)diol) or polyether diol (such as poly(polyethylene glycol).

According to an embodiment of the disclosure, the (c) bisphenol fluorene derivative has a structure represented by Formula (II):

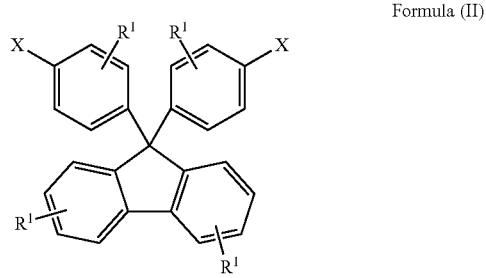

Formula (II)

Wherein: $R_1$ is independently a hydrogen, $C_{1-8}$ alkyl group, $C_{1-8}$ alkoxy group, or halogen; X is

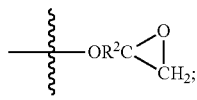

and $R_2$ is independently a hydrogen, $C_{1-8}$ alkyl group, $C_{1-8}$ alkoxy group, or $C_{1-8}$ alkanol group. Further, the (c) bisphenol fluorene derivative can be

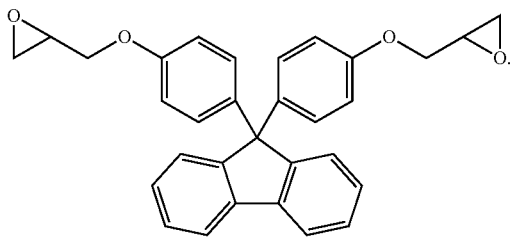 [SMILES: c1ccc2c(c1)-c1ccccc1C2(c1ccc(OCC2CO2)cc1)c1ccc(OCC2CO2)cc1]

The disclosure also provides a method for preparing the aforementioned high refractive polymer including the following steps. First, an (a) anhydride is provided to react with a (b) polydiol, obtaining a compound. Next, a (c) bisphenol fluorene derivative is provided to react with the compound, obtaining a high refractive polymer.

It should be noted that an antioxidant, a catalyst, or a diluent can be optionally added during the reaction between the (a) anhydride and the (b) polydiol and/or the reaction between the compound and the (c) bisphenol fluorene derivative. Particularly, the antioxidant can be a hindered phenolic antioxidant such as CHINOX® TP-10H, CHINOX® TP-80H, CHINOX® 1076, the diluent can be OPPEOA, PCL diol, and the catalyst can be tetramethylammonium chloride (TMAC). Further, according to some embodiments of the disclosure, the high refractive polymer can be prepared by reacting the (c) bisphenol fluorene derivative with the (b) polydiol in the absence of the (a) anhydride. The mechanism of the above reaction is that the epoxy group of the (c) bisphenol fluorene derivative undergoes a ring opening reaction through a heat treatment, and thus, reacts with the (b) polydiol.

The following examples are intended to illustrate the invention more fully without limiting their scope, since numerous modifications and variations will be apparent to those skilled in this art.

EXAMPLE 1

0.2 mole of poly(caprolactone)diol (Cas no:36890-68-3; molecular weight: 530; having a structure represented by H-PCL-H, wherein PCL had a structure represented by a

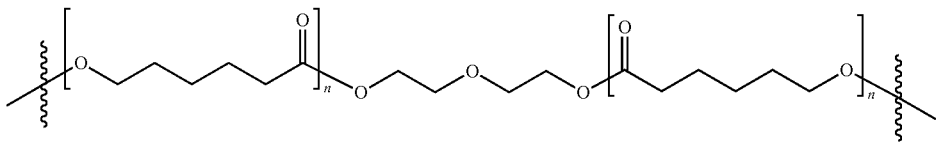

($n \geq 1$)) was added into a 500 ml reaction bottle. Next, a 0.1 mole of succinic anhydride was added into the reaction bottle to react with the poly(caprolactone)diol in the presence of an antioxidant (TP-80H, added in an amount of less than 0.5 wt %) for 4 hrs under a nitrogen atmosphere.

Next, a 0.1 mole of F9PG and O-phenylphenoxyethyl Acrylate (OPPEOA, cas no:72009-86-0) were added into the reaction bottle and stirred for 4 hrs, obtaining a high refractive polymer (1). Finally, the refractivity, transparency, and weatherability of the high refractive polymer (1) were measured, and the results are shown in Table 1.

The synthesis pathway of the high refractive polymer (1) was as follows:

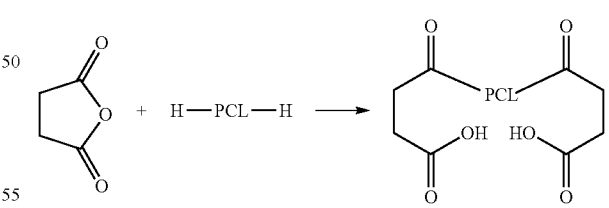

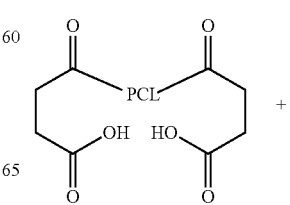

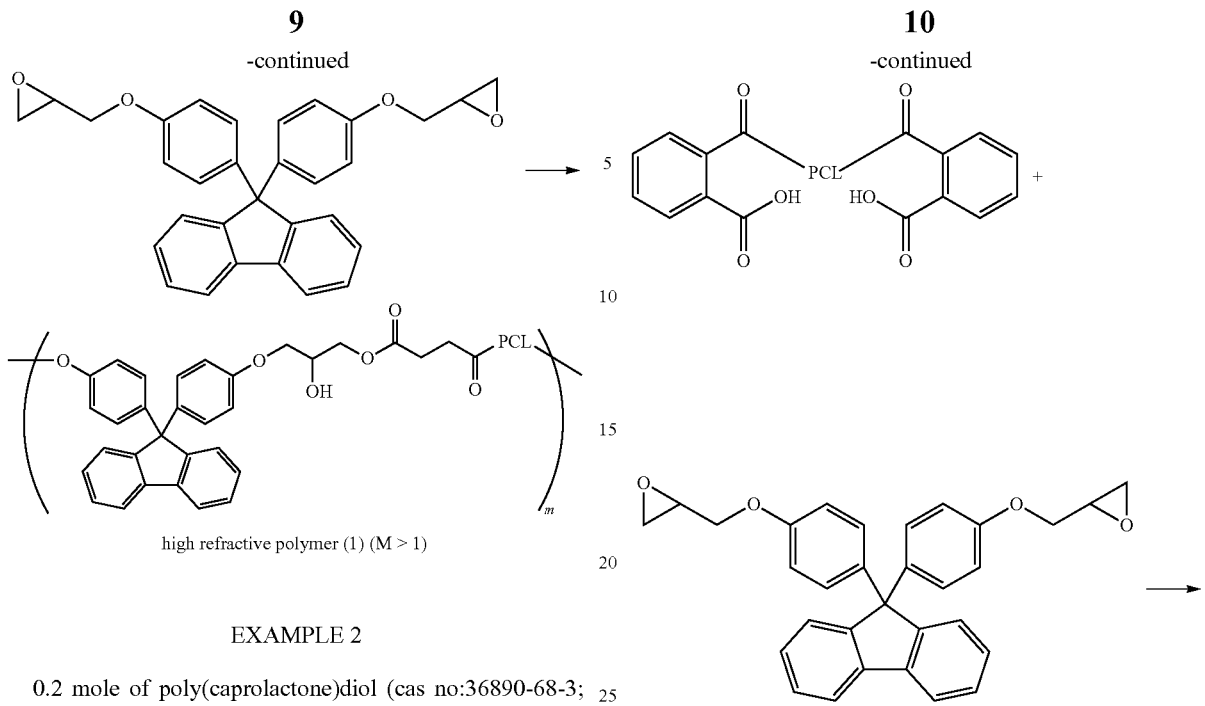

high refractive polymer (1) (M > 1)

EXAMPLE 2

0.2 mole of poly(caprolactone)diol (cas no:36890-68-3; molecular weight: 530; having a structure represented by H-PCL-H, wherein PCL had a structure represented by a

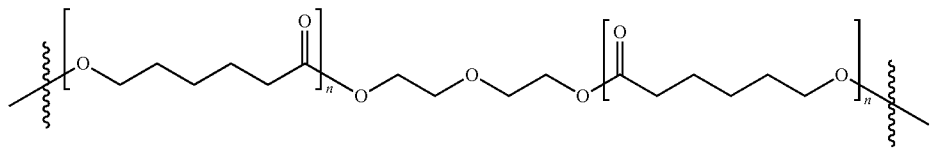

(n≥1)) was added into a 500 ml reaction bottle. Next, a 0.1 mole of phthalic anhydride was added into the reaction bottle to react with the poly(caprolactone)diol in the presence of an antioxidant (TP-80H, added in an amount of less than 0.5 wt %) for 4 hrs under a nitrogen atmosphere.

Next, a 0.1 mole of F9PG and O-phenylphenoxyethyl Acrylate (OPPEOA, cas no:72009-86-0) were added into the reaction bottle and stirred for 4 hrs, obtaining a high refractive polymer (2). Finally, the refractivity, transparency, and weatherability of the high refractive polymer (2) were measured, and the results are shown in Table 1.

The synthesis pathway of the high refractive polymer (2) was as follows:

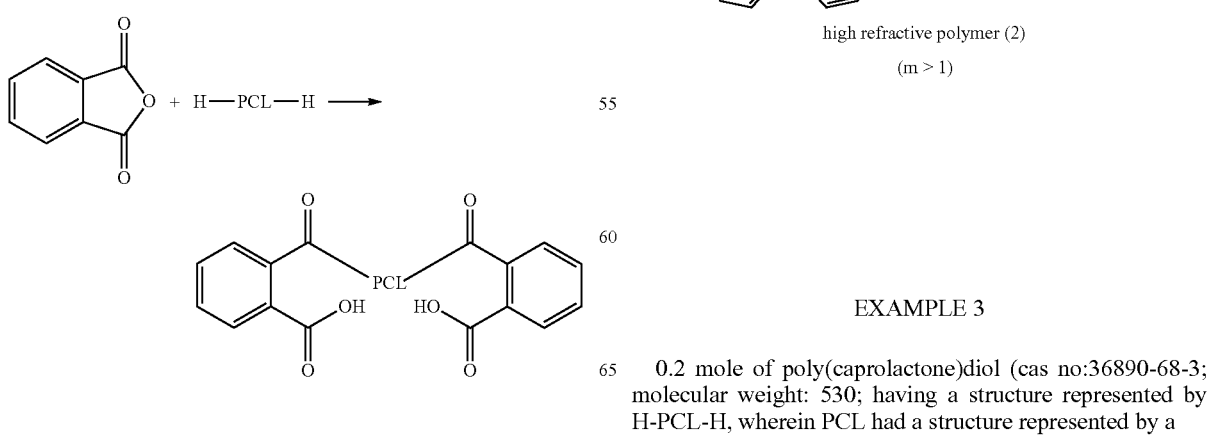

high refractive polymer (2)

(m > 1)

EXAMPLE 3

0.2 mole of poly(caprolactone)diol (cas no:36890-68-3; molecular weight: 530; having a structure represented by H-PCL-H, wherein PCL had a structure represented by a

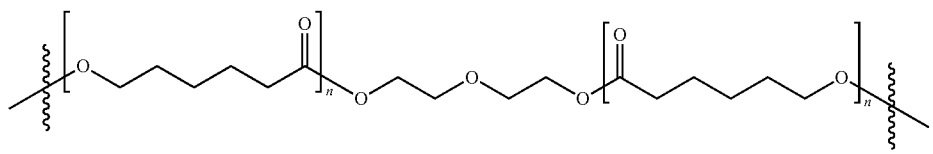

(n≥1)) was added into a 500 ml reaction bottle. Next, a 0.1 mole of methyl-5-norbornene-2,3-dicarboxylic anhydride was added into the reaction bottle to react with the poly(caprolactone)diol in the presence of an antioxidant (TP-80H, added in an amount of less than 0.5 wt %) for 4 hrs under a nitrogen atmosphere.

Next, a 0.1 mole of F9PG and O-phenylphenoxyethyl Acrylate (OPPEOA, cas no:72009-86-0) were added into the reaction bottle and stirred for 4 hrs, obtaining a high refractive polymer (3). Finally, the refractivity, transparency, and weatherability of the high refractive polymer (3) were measured, and the results are shown in Table 1.

The synthesis pathway of the high refractive polymer (3) was as follows:

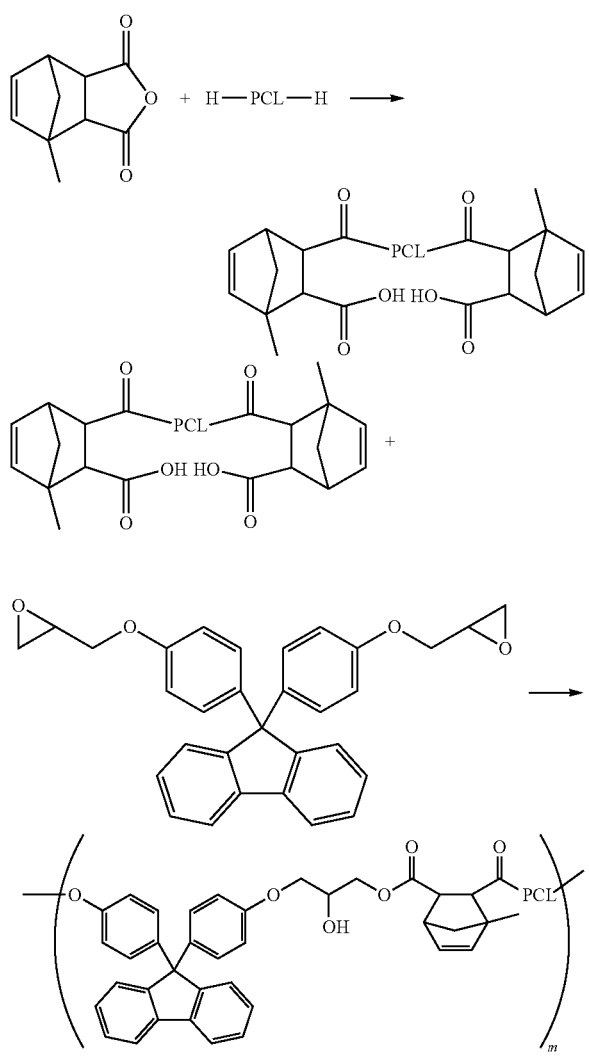

high refractive polymer (3)

(m > 1)

TABLE 1

|  | high refractive polymer (1) | high refractive polymer (2) | high refractive polymer (3) |
|---|---|---|---|
| refractivity, | 1.566 | 1.567 | 1.565 |
| transparency (%) (measured after curing) | 97.4 | 97.3 | 96.4 |
| transparency (%) (measured after exposing in UV light(19 mW/cm$^2$, 365 nm) for 4 hr) | 95.1 | 88.7 | 90.5 |

Remark: The test sample of the high refractive polymer had a thickness of 1 mm, and the transparency was measured by irradiating light with a wavelength of 450 nm.

According to the embodiment of the disclosure, high refractive polymers can have a refractivity of more than 1.54, and a transparency of more than 95%. Further, after baking at 120° C. for 1000 hrs or exposure to UV light (19 mW/cm$^2$, 365 nm) for 4 hrs, the high refractive polymer still exhibited a transparency of between 89.5-95.5%. Therefore the high refractive polymer also exhibited high weatherability. Accordingly, since the high refractive polymer of the disclosure is prepared by reacting the bisphenol fluorene derivative having an alcoholic group (high refractivity and high thermal stability) with a long chain polydiol via the anhydride, the high refractive polymer exhibits high refractivity, high transparency, high weatherability, and great film forming properties.

In addition to the above advantages, the high refractive polymer of the disclosure has high yellowing resistance, suitable for serving as, for example, an encapsulation material, a transparent substrate, a lens (such as fresnel lens), or a functional film. Further, the high refractive polymer can be further applied in a light emitting diode, a solar cell (such as concentrator photovoltaic cell), semiconductor device, or display device.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A high refractive polymer, comprising a repeat unit represented by Formula (I)

Formula (I)

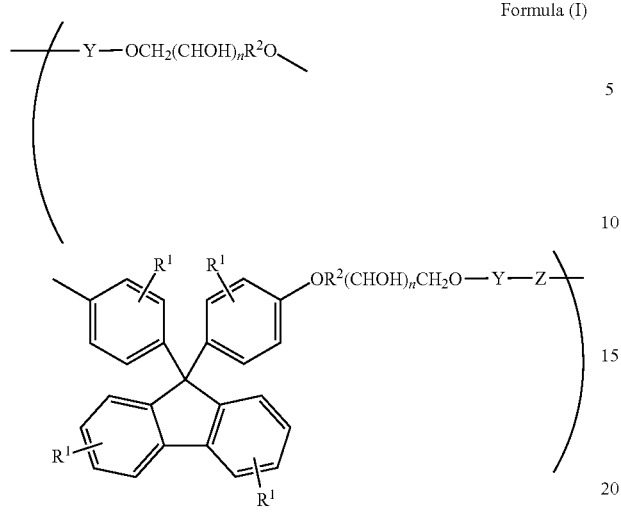

wherein: $R_1$ is independently an H, $C_{1-8}$ alkyl group, $C_{1-8}$ alkoxy group, or halides; $R_2$ is independently an $C_{1-8}$ alkyl group, $C_{1-8}$ alkoxy group, or $C_{1-8}$ alkanol group; n is 0, or 1; Y is

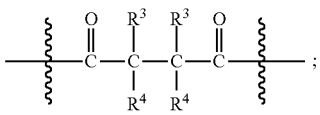

$R_3$ and $R_4$ are; and Z is

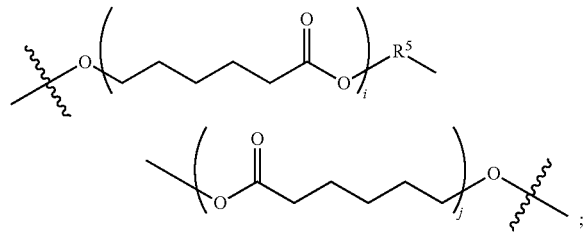

wherein $R_5$ is an alkyl group or alkoxy group, and i and j are independently an integer equal to or greater than 1.

2. A high refractive polymer, comprising a product produced by the following steps:
reacting an (a) anhydride with a (b) polydiol to prepare a compound, wherein the (a) anhydride is succinic anhydride, and the (b) polydiol is

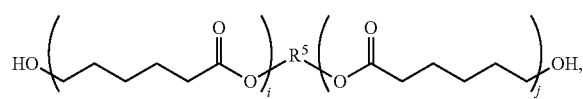

wherein $R_5$ is an alkyl group or alkoxy group, and i and j are independently an integer equal to or greater than 1; and
reacting the compound with a (c) bisphenol fluorene derivative, wherein the (c) bisphenol fluorene derivative has a structure represented by Formula (II):

Formula (II)

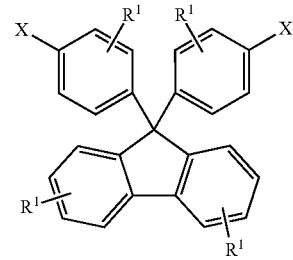

wherein $R_1$ is independently a hydrogen, $C_{1-8}$alkyl group, $C_{1-8}$alkoxy group, or halogen; X is

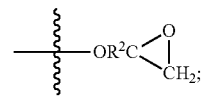

and $R_2$ is independently a hydrogen, $C_{1-8}$alkyl group, $C_{1-8}$alkoxy group, or $C_{1-8}$alkanol group.

3. The high refractive polymer as claimed in claim 2, wherein the (c) bisphenol fluorene derivative is

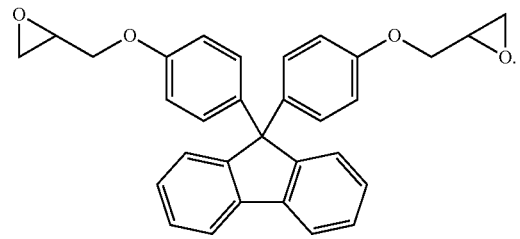 [SMILES: c1ccc2c(c1)-c1ccccc1C2(c1ccc(OCC2CO2)cc1)c1ccc(OCC2CO2)cc1]

4. An optical element, comprising the high refractive polymer as claimed in claim 1.

5. The optical element as claimed in claim 4, wherein the optical element is an encapsulation material, a transparent substrate, a lens, or a functional film.

6. A photoelectric device, comprising the optical element as claimed in claim 4.

7. A method for preparing a high refractive polymer, comprising:
reacting an (a) anhydride with a (b) polydiol to prepare a compound, wherein the (a) anhydride is succinic anhydride, and the (b) polydiol is

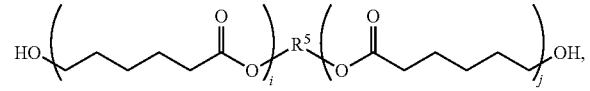

wherein $R_5$ is an alkyl group or alkoxy group, and i and j are independently an integer equal to or greater than 1; and
reacting the compound with a (c) bisphenol fluorene derivative, wherein the (c) bisphenol fluorene derivative has a structure represented by Formula (II):

Formula (II)

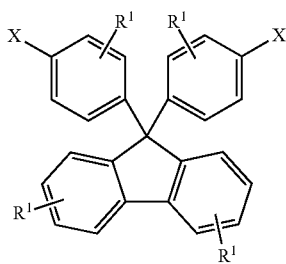

wherein $R_1$ is independently a hydrogen, $C_{1-8}$ alkyl group, $C_{1-8}$ alkoxy group, or halogen; X is

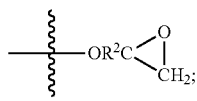

and $R_2$ is independently a hydrogen, $C_{1-8}$ alkyl group, $C_{1-8}$ alkoxy group, or $C_{1-8}$ alkanol group.

8. The method as claimed in claim 7, wherein the compound reacts with the (c) bisphenol fluorene derivative in the presence of an initiator.

9. The method as claimed in claim 7, wherein the (c) bisphenol fluorene derivative is

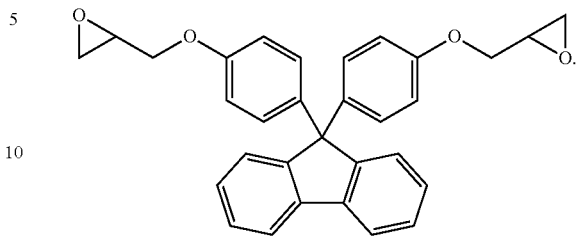

10. The method as claimed in claim 7, wherein a molar ratio between the (a) anhydride and the (b) polydiol is equal to or more than 2.

11. The high refractive polymer of claim 1, wherein the polycaprolactone diol has a molecular weight of 530.

12. The high refractive polymer of claim 1, wherein the high refractive polymer is free from aromatic polycarboxylic anhydride.

13. The method as claimed in claim 7, wherein an antioxidant is added during the step of reacting the (a) anhydride with the (b) polydiol.

* * * * *

UNITED STATES PATENT AND TRADEMARK OFFICE
CERTIFICATE OF CORRECTION

PATENT NO. : 8,791,211 B2
APPLICATION NO. : 13/160119
DATED : July 29, 2014
INVENTOR(S) : Ming-Jyh Chang et al.

Page 1 of 1

It is certified that error appears in the above-identified patent and that said Letters Patent is hereby corrected as shown below:

On the title page item (30) Foreign Application Priority Data, the CN application number should be corrected from "2011 1 0034374" to --2011 1 0034374.1--

Signed and Sealed this
Eleventh Day of November, 2014

Michelle K. Lee
*Deputy Director of the United States Patent and Trademark Office*